United States Patent [19]

Martinen et al.

[11] Patent Number: 4,807,236

[45] Date of Patent: Feb. 21, 1989

[54] GAS LASER WITH HIGH-FREQUENCY EXCITATION

[75] Inventors: Hinrich Martinen, Quickborn; Samuel Simonsson; Peter Wirth, both of Winsen, all of Fed. Rep. of Germany

[73] Assignee: Rofin-Sinar Laser GmbH, Hamburg, Fed. Rep. of Germany

[21] Appl. No.: 72,310

[22] Filed: Jul. 13, 1987

[30] Foreign Application Priority Data

Jul. 16, 1986 [DE] Fed. Rep. of Germany ... 8619083[U]

[51] Int. Cl.⁴ .............................................. H01S 3/03
[52] U.S. Cl. .......................................... 372/33; 372/61; 372/82; 372/87; 313/234; 313/590
[58] Field of Search .................. 372/82, 81, 87, 33, 372/61; 313/590, 607, 231.71, 234

[56] References Cited

U.S. PATENT DOCUMENTS

| | | | |
|---|---|---|---|
| 3,528,028 | 9/1970 | Baird | 313/607 |
| 4,359,777 | 11/1982 | Fox et al. | 372/61 |
| 4,381,564 | 4/1983 | Newman | 372/87 |
| 4,596,018 | 6/1986 | Gruber et al. | 372/82 |
| 4,597,086 | 6/1986 | Kimbara | 372/61 |
| 4,698,822 | 10/1987 | Leprince et al. | 372/70 |
| 4,703,487 | 10/1987 | Koseki | 372/33 |

FOREIGN PATENT DOCUMENTS 0152084  8/1985  European Pat. Off. .

*Primary Examiner*—William L. Sikes
*Assistant Examiner*—Xuan Thi Vo
*Attorney, Agent, or Firm*—Townsend & Townsend

[57] ABSTRACT

The gas laser with high-frequency excitation exhibits a laser tube (1), to which at least one pair of electrodes (5, 6) for the high-frequency excitation is externally fitted, and at least one inlet connection (2) and one outlet connection (3) for the gas. In order to permit a shorter distance between the pair of electrodes (5, 6) and the outlet connection (3), it is provided that a disc (12) having a high dielectric constant is disposed on the tube (1) between the pair of electrodes (5, 6) and the outlet connection (3), which disc extends substantially perpendicular to the axis of the tube.

6 Claims, 2 Drawing Sheets

GAS LASER WITH HIGH-FREQUENCY EXCITATION

BACKGROUND OF THE INVENTION

1. Field of the Invention

The invention relates to a gas laser with high-frequency excitation, having at least one laser tube, to which at least one pair of electrodes for the high-frequency excitation is externally fitted, and having at least one inlet connection and one outlet connection for the gas.

2. Background and Description of the Prior Art

In such gas lasers, a gas or plasma which is excited by the high frequency flows through the laser tube. In this procedure, the high-frequency excitation displaces the gas into such a condition that laser action can take place between appropriate mirrors. In this procedure, the gas is very intensely heated by the high-frequency excitation, so that it must be cooled; this takes place by means of an appropriate circuit, in which the gas is also conducted past a heat exchanger.

Metal blocks are disposed at the positions at which the gas is supplied and withdrawn, in which blocks there is inserted the actual laser tube, which in most cases consists of quartz glass. The objective is to make the distance between the pairs of electrodes and these blocks as small as possible, so that compact external dimensions are imparted to the laser. Moreover, in this instance, at least in the case of the outlet connection, this arrangement achieves the advantage that the hot gas path between electrodes and the outlet connection becomes as small as possible. This is essential, since the hot gas or plasma is no longer excited by the high frequency in this region, but, because of its high temperature, no longer leads to optimal laser activity. If the temperature in this region is very high, i.e. higher than approximately 500 degrees K then it is even possible here for absorption of the laser power to take place.

If, however, as is desirable per se for the two reasons which have been mentioned, the distances between the electrodes and the outlet blocks, which normally consist of metal, are now made very small, parasitic discharges take place via the gas or plasma between the electrodes and the block. However, in all circumstances it would be desired that these parasitic discharges, which are difficult to control, should be avoided. It was formerly only known to increase the distance between pairs of electrodes or outlet blocks; however, this leads to the abovementioned disadvantage of the longer hot gas path. On the other hand, if the outlet blocks are produced from ceramic or similar material, the entire installation becomes very expensive.

3. Objectives of the Invention

It is an objective of the invention to make smaller the distance between the pairs of electrodes and the outlet connection in such a gas laser, without the system becoming more expensive as a result or parasitic discharges being caused, thereby minimizing undesired absorbtion of laser energy.

SUMMARY OF THE INVENTION

According to the invention, the object is achieved in that a disc having a high dielectric constant is disposed on the tube between the pair of electrodes and the outlet connection, which disc extends substantially perpendicular to the axis of the tube.

This disc gives rise to the surprising effect that the stray field is concentrated or short-circuited at the end of the electrodes which is directed towards the outlet block, so that it does not pass, or only passes to a harmless extent, to the outlet block. In this case, the above-mentioned parasitic discharges cannot take place, although the distance between the pair of electrodes and the outlet block can be made smaller; as has been stated, this leads to a more compact laser construction, but principally to a shorter hot plasma or gas path.

Accordingly, as a result of the dielectric disc the stray field of the electrode edge is concentrated onto a region which is situated closer to the electrode edge. In a preferred embodiment, it has proved to be particularly expedient if the material of the disc has a dielectric constant of approximately 2 to 4.

Because the material of the disc has low dielectric losses, the danger of the disc becoming heated by the high-frequency power during operation of the laser is avoided. In a preferred embodiment, it has proved to be particularly advantageous if the loss factor tan δ is below $10^{-3}$.

Furthermore, in a preferred embodiment it has proved to be advantageous if the distance of the disc from the pair of electrodes amounts to at least approximately ⅓ of the diameter of the laser tube.

The disc according to the invention acts particularly advantageously in the excess-power pulsing of lasers, the so-called superpulsing.

BRIEF DESCRIPTION OF THE DRAWING

The invention is described herein below by way of example, with the aid of advantageous embodiments, with reference to the accompanying drawings. In the drawings.

DETAILED DESCRIPTION OF THE PREFERRED EMBODIMENT

Figure 1:
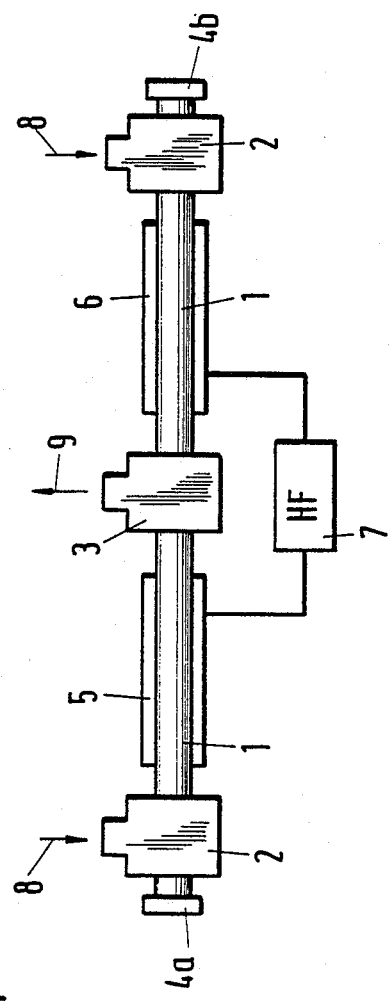
FIG. 1 shows the principle of a gas laser with high-frequency excitation.

FIG. 1 shows a gas laser, the laser tube (1) of which consists of several parts, which are fitted into inlet blocks (2) for the gas and an outlet block (3) for the gas. The laser mirrors (4a and 4b) are situated at the ends of the laser tube (1). Pairs of electrodes (5, 6), which are acted upon with high frequency by means of a high-frequency source (7), are directly fitted onto the laser tube (1), which can, for example, consist of quartz glass.

The gas is introduced into the inlet blocks (2) in the direction of the arrows (8) and flows from there via the appropriate parts of the laser tube (1) to the outlet block (3), which it leaves in the direction of the arrow (9). Subsequently, the gas is then cooled in a heat exchanger and again introduced into the laser by a pump at (8).

On passing through the discharge path in the region of the electrodes (5 and 6), the gas is very intensely heated. Accordingly, the distance between the electrodes (5, 6) and the outlet block (3) should be as small as possible.

The arrangement of FIG. 1 represents only a simple example and merely the basic construction. It is also possible for more discharge paths and electrodes respectively to be provided at a tube at the same time; in these circumstances, the number of blocks (2, 3) would then also be appropriately increased. Moreover, a plurality of laser tubes can be disposed side by side in the known manner of a folded laser.

Figure 2:
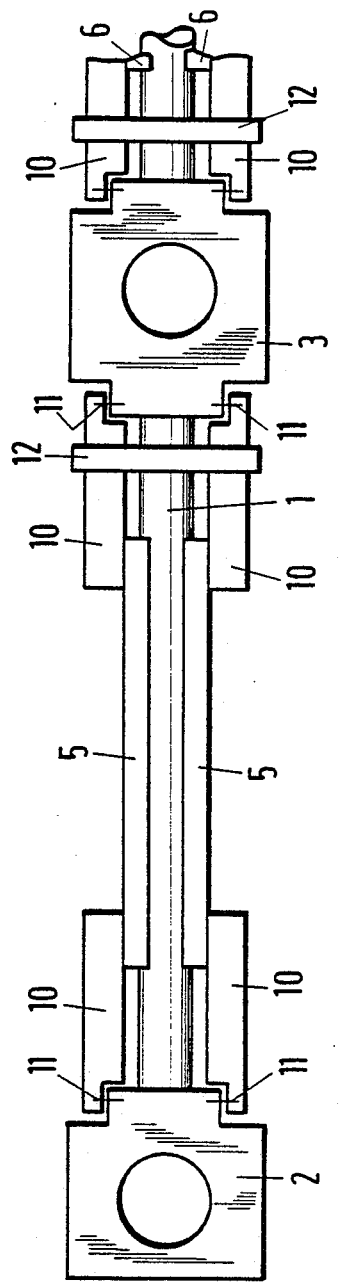
FIG. 2 shows the arrangement according to the invention, in plan view.

An actual arrangement is shown in FIG. 2. In the left-hand part of the Figure, a laser tube (1) is disposed between an inlet block (2) and an outlet block (3). The electrodes (5), which partially surround the laser tube (1), are held by holders (10), which are secured to the blocks and which have a substantially rectangular cross-section. These holders (10) are secured to the blocks (2, 3) by securing means indicated at (11), e.g. screws; they advantageously consist of a material with a high dielectric constant, but in any event with a small loss factor. A disc (12) according to the invention, with a high dielectric constant, is now pressed onto the laser tube (1) between the electrodes (5) and the outlet block (3); because of its high dielectric constant, the disc represents, so to speak, a short circuit for the stray field of the edge of the electrodes (5).

In order that the laser construction should not become unnecessarily large in a direction perpendicular to the axis of the tube, in spite of the additional disc, the disc can be provided with the recesses at its edge to receive securing elements of the electrodes, thereby adapting the disc to receive the securing elements for mounting the electrodes. The securing elements at the regions of engagement with the disc recesses may be of the same dielectric material as the disc to compensate for the material lost in the disc due to the recesses.

Figure 3:
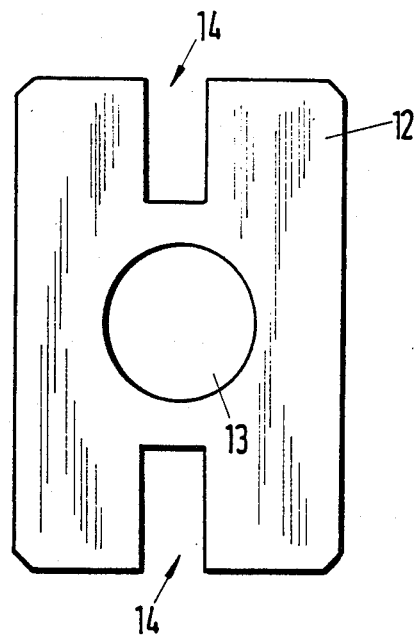
FIGS. 3 and 4 show embodiments of the disc of the invention.
Figure 4:
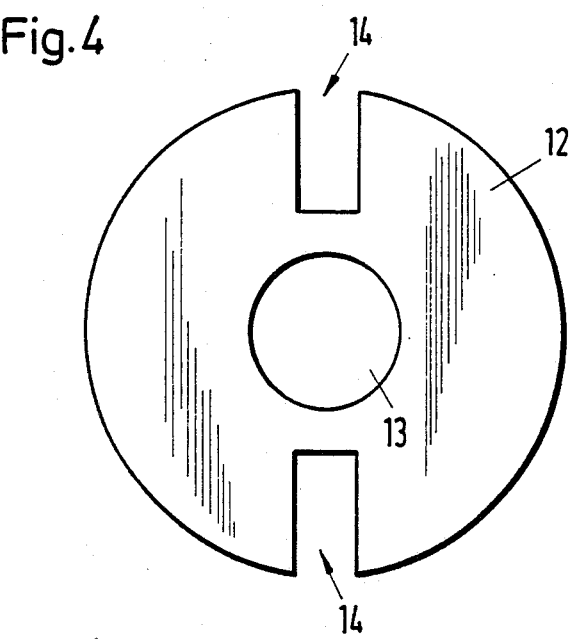

FIGS. 3 and 4 show two forms of the disc, namely a substantially rectangular disc having rounded corners and a circular disc respectively. In this connection, the discs (12) exhibit a central aperture (13), the diameter of which corresponds to the external diameter of the laser tube (1). They further exhibit two slit-shaped recesses (14), in which the holders (10) for the electrodes (5, 6) can be received.

As can be seen in FIG. 2, in that instance not just a single disc (12) is provided, but a further one is provided on the right between the outlet block (3) and the next set (6) of electrodes.

What is claimed is:

1. In a waveguide gas laser of the type having a laser tube of a given diameter, an inlet block adapted to direct a gas into the tube, an outlet block adapted to discharge the gas from the tube, at an elevated temperature, a pair of externally mounted high conductivity metal electrodes adapted to apply a high frequency excitation signal to the tube for exciting the laser, the electrode pair being situated between the outlet block and the inlet block, the improvement comprising a disc extending about the tube in a plane substantially perpendicular to the axis of said tube, having a high dielectric constant, and being positioned between said electrodes and said outlet block.

2. The improved gas laser according to claim 1 characterized in that the material of the disc has a dielectric constant of approximately 2 to 4.

3. The improved gas laser according to claim 1 characterized in that the material of the disc has low dielectric losses.

4. The improved gas laser according to claim 3, characterized by a loss factor tan $\delta$ below $10^{-3}$.

5. The improved gas laser according to claim 1, characterized in that the distance of the disc from the pair of electrodes amounts to at least approximately $\frac{1}{3}$ of the diameter of the laser tube (1).

6. The improved laser according to claim 1, wherein the electrodes include securing elements, and the disc includes recesses at its edge for receiving said securing elements for mounting the electrodes.

* * * * *